US006568774B2

United States Patent
Hitzschke et al.

(10) Patent No.: US 6,568,774 B2
(45) Date of Patent: May 27, 2003

(54) PULSED OPERATION METHOD FOR A SILENT DISCHARGE LAMP

(75) Inventors: Lothar Hitzschke, Munich (DE); Frank Vollkommer, Buchendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/959,588

(22) PCT Filed: Jan. 9, 2001

(86) PCT No.: PCT/DE01/00044
§ 371 (c)(1),
(2), (4) Date: Oct. 30, 2001

(87) PCT Pub. No.: WO01/67827
PCT Pub. Date: Sep. 13, 2001

(65) Prior Publication Data
US 2002/0158589 A1 Oct. 31, 2002

(30) Foreign Application Priority Data
Mar. 9, 2000 (DE) .......................................... 100 11 484

(51) Int. Cl.$^7$ ............................................... H05B 41/16
(52) U.S. Cl. ........................ 316/246; 315/268; 315/276; 315/284; 315/224
(58) Field of Search .................................. 315/246, 268, 315/274, 276, 277, 283, 284, 224

(56) References Cited

U.S. PATENT DOCUMENTS 6,353,294 B1 * 3/2002 Wammes et al. ............ 315/246
6,369,519 B1 * 4/2002 Okamoto et al. ............ 315/224
6,411,039 B1 * 6/2002 Vollkommer et al. ......... 315/58

FOREIGN PATENT DOCUMENTS

| EP | 0 781 078 | 6/1997 |
|---|---|---|
| EP | 0 817 542 | 1/1998 |
| EP | 0 907 306 | 4/1999 |
| WO | 94 23442 | 10/1994 |
| WO | 99 46963 | 9/1999 |

* cited by examiner

Primary Examiner—Haissa Philogene
Assistant Examiner—Tuyet T. Vo
(74) Attorney, Agent, or Firm—Robert F. Clark

(57) ABSTRACT

The invention improves an operating method, already described in the prior application 198 39 329.6, for a silent discharge lamp L, in which, using the forward transformer principle, a voltage pulse effecting a forward ignition is impressed from a primary circuit P via a transformer T into a secondary circuit S containing the silent discharge lamp L, and the secondary circuit S thereafter executes a half wave which, as a consequence of the polarization, leads to a back ignition in the discharge lamp L. The improvement consists essentially in that an inductance of the transformer T which governs a transformer current is temporally varied.

20 Claims, 8 Drawing Sheets

PULSED OPERATION METHOD FOR A SILENT DISCHARGE LAMP

The present invention relates to an operating method for what is termed a silent discharge lamp. This is understood as a type of discharge lamp in which what are termed dielectrically impeded discharges are employed to generate light. The discharge is dielectrically impeded owing to a dielectric layer between the discharge medium of the discharge lamp and at least one of the electrodes. Silent discharge lamps per se are prior art and will not be explained here in detail.

The present invention is based on an operating method, developed by the same inventors, for pulsed coupling of active power into a quiet discharge lamp. Reference is made in this regard to WO94/23442, whose disclosure content is hereby incorporated by reference. The operating method described there forms the basis of the invention described below. It is of paramount importance that what are termed dead times without substantially coupling active power are inserted between individual pulses if active power is coupled into the discharge lamp, and the length of these dead times is dimensioned up to a new pulse which couples active power such that a specific type of discharge described in the cited application and having a particularly high discharge efficiency is formed. The dead times may not be too long for this purpose, because each active-power pulse is then to be evaluated as a new ignition, as it were, and the absence of a connection between the individual active-power pulses renders it impossible to achieve good efficiency, a sufficient lamp power or else good temporal and spatial stability. If the dimensions of the dead times between the active-power pulses are, on the other hand, too short, filamentous discharges form which exhibit poor efficiency and, moreover, a poor temporal and spatial stability.

An invention of the same inventors already filed as an application proposed an operating method and a ballast for a silent discharge lamp with the aid of which the outlined pulsed operating method of WO94/23442 can be implemented particularly effectively. The associated patent application with the file reference 198 39 329.6 has not yet been published at the application date of the present invention, but forms a technical basis for the invention explained below. The disclosure content of this second prior application is therefore also referred to completely.

In particular, it was proposed in this prior application to use a ballast in accordance with the forward converter principle, in which a voltage pulse is impressed from a primary circuit via a transformer into a secondary circuit containing the discharge lamp, and leads to an ignition (termed forward ignition below) in the discharge lamp. The operating method is designed in this case such that after the forward ignition in the discharge lamp an oscillation is set up in the secondary circuit by means of which the charge effecting the external voltage across the discharge lamp, which has previously effected the forward ignition, is removed from the discharge lamp. Thereupon, the remaining internal counterpolarization can lead to a back ignition in the discharge lamp. Reference may be made to the cited application for the details of this basic principle.

In particular, it has already been described in the cited application as a preferred case that the temporal spacing between forward ignition and back ignition is so short that it is not to be regarded as dead time in the meaning of the pulsed operating method. Thus, the abovementioned dead times occur between in each case a back ignition and the forward ignition following thereupon, but not between this forward ignition and the back ignition following thereupon. The following also proceeds on this basis. The operating method described in the second cited application had been developed with the aim of achieving a favorable overall compromise with regard to the power efficiency, the overall volume and overall weight of the associated ballast, and the production costs, service life and failure frequency.

SUMMARY OF THE INVENTION

The present invention is based overall on the technical problem of further improving the described operating method according to the forward converter principle. In particular, it is to be possible to operate with the highest possible lamp powers in conjunction with small overall volume and overall weight and good efficiency.

According to the invention, it is provided for this purpose in accordance with claim 1 that in the described operating method an inductance governing the temporal variation in a current through the transformer is varied temporally within a period including a forward ignition and a back ignition such that the altered inductance is substantially larger in an initial phase of the impression of the voltage pulse which leads to the forward ignition than in at least a portion of the back ignition phase, in which the charge is removed from the discharge lamp after the forward ignition and the back ignition is performed.

The invention likewise aims at a ballast designed for this operating method, and at an illuminating system comprising such a ballast and a silent discharge lamp.

The following findings are fundamental in this case: the temporal behavior of the change in the external voltage across the discharge lamp is important for the physical nature, and thus also the efficiency of the silent discharge in the discharge lamp. In particular, it has emerged in this case that excessively large pulse widths should not be selected for ignition in the pulsed operating method. The special efficiency of the pulsed operating method is based, rather, on the fact that a dead time starts again after a relatively short pulse in the coupling of active power.

Consequently, the voltage pulse across the lamp, and therefore also the associated primary current pulse in the transformer must be relatively short.

In particular, the back ignition leads to a more efficient and more complete conversion of the energy stored in the secondary circuit the faster the secondary circuit swings back in the case of the half wave leading to the back ignition and during the back ignition, that is to say after the reignition as a consequence of the internal counter polarization. The aim is therefore to select the natural frequency or speed of the secondary circuit to be as high as possible. The inductance given in the secondary circuit by the transformer plays a substantial role in this speed.

On the other hand, however, it has also emerged that the discharge physics of the forward ignition can, in turn, be unfavorably influenced by excessively steep rising edges of the voltage at the start of a pulse leading to a forward ignition, and thus also by excessively steep rising edges at the start of the primary current rise. Evidently, the situation is that the occurrence of the discharge right at the beginning of the field build-up should favorably still be allowed sufficient time to prepare an optimum form of the discharge structures rendered possible by the pulsed operating method. An excessively low transformer inductance could give rise here to unfavorably steep rising edges. This, in turn, could worsen the efficiency of the discharge. If it is ensured by a sufficiently large primary circuit inductance that the forward ignition has a basic physical form suitable for very high efficiency, there will be no further fundamental subsequent change in this basic fact owing to the speed of the voltage rise in the primary and/or secondary circuit. Specifically, the still remanent residual ionization of the last back ignition is then preimpressed suitably for the new ignition by the electric fields building up.

However, the inductances caused by the transformer in the primary circuit and in the secondary circuit cannot in principle be selected entirely independently of one another. Consequently, the invention provides a temporal variation in at least one of the inductances governing the currents through the transformer.

In particular, the aim in this case is that no excessively low inductance be present in the primary circuit during the preparation of the forward ignition, that is to say in the initial phase of the primary current rise. On the other hand, the secondary circuit inductance is to be relatively low, at least in relation to a portion of the back ignition phase comprising the preparation of the back ignition and the back ignition itself. It is not stipulated with complete accuracy in the basic definition of the invention when precisely the temporal variations in inductance take place. A full freedom of choice in this regard does not exist for all embodiments of the invention.

On the one hand, such temporal variations in inductance can result from switching in a further inductor in a temporally variable fashion. A prescribed transformer inductance is reduced in this case by connecting a further inductor in parallel, and is increased by a connection in series. This can happen in principle in the primary circuit and/or in the secondary circuit. An appropriate connection in the primary circuit is technically simpler in this case. It is possible in the same way to use transistor switches as switching elements, as is provided for the clocking in the primary circuit in accordance with the explanations in the cited second prior application. Such transistor switches can be controlled in this case synchronously with the, and also by the same control device as for the clocking of the primary circuit current, it being possible for the switching instants to be selected freely in principle.

On the other hand, however, a particularly preferred aspect of the invention relates to an, as it were, automatically temporally variable design of the inductance by using the transformer in a saturation mode which exceeds drive levels generally normal for power transformers. This means that the transformer is preferably designed such that not only does it just go into saturation "in a tolerated way" in specific operating phases at the edge of its modulation, but that a substantial portion of its modulation already lies in the saturation region. There is a substantial reduction in the transformer inductance in the saturation region in this case owing to the sizeable reduction in the relative permeability of the core material occurring during the saturation of the transformer core.

Over and above this, it has emerged from the inventors' experiments that the transformer losses constitute a substantial problem area in the case of a further power rise in conjunction with a prescribed magnitude of the ballast. The practical effect of this is that, starting from a certain power, the thermal losses in the transformer lead to an intolerable deterioration in efficiency and to thermal instability.

The conventional consequence for the person skilled in the art from the fact that the transformer losses increase with higher drive level would be an enlargement of the transformer, in order in this way to be able to reduce the drive level. Specifically, in the case of power transmission the general rule of thumb of avoiding relatively high drive levels of the core materials above 150 mT applies, in order to keep the losses manageable. The point is that the volume-specific magnetic losses in the core materials increase very strongly with increasing drive level. Moreover, they also have a frequency dependence which is, however, of no further interest here. With the ferrite materials normally used, the saturation region is still remote in the case of 150 mT, as follows from the quantitative considerations illustrated in the exemplary embodiments.

The invention here pursues exactly the opposite avenue, because it has emerged that the transformer losses are certainly manageable in the case of a very intensive degree of saturation of a comparatively small transformer. Finally, the transformer losses occur substantially in the hysteresis region of the transformer core. Starting from a drive level of the transformer which approaches the saturation region, these hysteresis losses then virtually no longer increase. On the other hand, a transformer with a correspondingly low volume can be used due to a very strong degree of saturation of the transformer. Although the transformer losses are thereby high with reference to the core volume, they are not excessive in absolute terms, because of the small core volume. It has emerged overall that, together with the further improvement in the discharging efficiency, it is possible to achieve a rise in efficiency, while it is possible nevertheless in this case for the overall volume and overall weight of the ballast, which is essentially determined by the transformer, to be substantially reduced.

It may be remarked at this point that the discussions in this description and the wording of the claims applies in the same way, of course, to the use of two or more transformers instead of a single one. In technical terms, this constitutes only a subdivision of the transformer, but not a change in principle.

The drive level of the transformer is given in this case by the magnetic field in the transformer core.

Consequently saturation occurs chiefly during the back ignition phase, because here relatively large secondary currents can flow without the accompaniment of correspondingly large primary currents. Given sufficiently large secondary currents during the back ignition, saturation occurs, in particular, as early as at the beginning of the back ignition, so that the secondary circuit can swing back quickly and decisively because of the reduced natural frequency. Relatively large primary currents and secondary currents occur simultaneously during the forward ignition phase. The secondary currents are directed such that they attenuate the positive time derivative, producing them, of the magnetic induction, that is to say they partially compensate the magnetic induction in the case of a positive time derivative by an appropriate counterfield. It is therefore not stipulated within the scope of invention whether saturation of the transformer occurs in the forward ignition phase. This can certainly happen through a correspondingly high-resistance impedance of the load in the secondary circuit and, consequently, a low strength of the secondary currents, that is to say a weak compensation effect. However, it is not necessary for the invention. In any case, the saturation effect will not be present right at the beginning of the forward ignition phase, since even the primary currents per se are too small there. By way of illustration reference may be made to the current profile curves explained in the exemplary embodiments.

A further desired effect can also occur in connection with the already explained reduction in the transformer inductance in the secondary circuit and with the consequently increased speed of the secondary circuit. Not only does the transformer inductance determine the speed of charge-reversal operations in the secondary circuit—together with the secondary circuit capacitance, usually defined substantially by the discharge lamp, and the ohmic resistances in the secondary circuit, it is important for the total impedance of the secondary circuit. In many cases, the transformer inductance is the decisive variable in this case. A reduction in the transformer inductance in the secondary circuit therefore entails a marked reduction in impedance in the secondary circuit, and thus the possibility of relatively large lamp currents during the back ignition.

It remains to remark with reference to the cited prior application that the invention described here also preferably provides reducing a residual magnetization at the transformer with the aid of the back ignition. It was argued there that saturation of the transformer had to be feared without a reduction in this residual magnetization. However, what was meant there was a situation in which the amounts of energy remain permanently in the secondary circuit (specifically in accordance with the residual magnetization) or are displaced to and fro between the primary circuit and secondary circuit, without actually being converted in the discharge lamp. Such amounts of energy certainly occur as outputs in the ballast, and so the latter must be appropriately designed, but they do not increase the power of the lamp. They are therefore to be avoided as far as possible. The saturation of the transformer aimed at within the scope of the invention present here relates, however, to a saturation which is always being built up anew with each operating cycle, that is to say is associated with energies and/or outputs which are transported from the primary circuit into the secondary circuit and, as far as possible, into the discharge lamp. A state of saturation is therefore not disadvantageous per se, as already explained above.

It is also preferred in this invention that the secondary circuit is isolated as a resonant circuit by electrical isolation from the primary circuit after the forward ignition. It is preferred in this case that the primary side of the transformer is opened after the forward ignition, the primary circuit current therefore being completely switched off. Furthermore, irrespective of the resonant circuit properties, it is a preferred aspect of the invention that the primary circuit current is virtually zero during the back ignition.

Reference is made in this regard to the explanations concerning the saturation states of the transformer in the exemplary embodiments.

It is preferable to provide for switching off the primary circuit current a switch, in particular a transistor switch, which opens the primary side after the forward ignition, performed according to the forward transformer principle. Thus, with regard to the ballast and the illuminating system, the invention is distinguished by this switch and the design of its control device, as well as by the design of the transformer or by another device for achieving the temporal variation in the inductances.

According to the invention, the most favorable instants for interrupting the primary circuit current lie in a range in which the primary circuit current would exhibit a minimum if there were no interruption. Specifically, were the primary circuit to remain closed after the forward ignition, the primary circuit current would exhibit an intermediate minimum after the maximum during the forward ignition, the quenching of the forward ignition, the ohmic resistance, rising steeply once again, of the discharge lamp, and the corresponding current decrease. The primary circuit current would then rise with time again in accordance with the properties of the transformer. This minimum is an advantageous switching instant, because owing to the minimum primary circuit current the switching losses in the switching transistor, for example, are also minimal.

A MOSFET with a freewheeling diode is, moreover, particularly suitable as the switch. Thus, even given interruption of the actual primary circuit current, it is advantageously possible for demagnetizing currents (for demagnetizing the transformer) to flow in the primary circuit and, for example, to recharge a storage capacitor of the power supply of the primary circuit. A demagnetizing device would thereby be implemented despite electrical isolation between the primary circuit and secondary circuit—accompanied by the corresponding safety advantages.

Preferred embodiments of the invention relate to preferred quantitative delimitations in connection with the temporal variation in inductance. The first of these variants relates to the transformer inductance in the primary circuit which, preferably at the start of the voltage pulse leading to the forward ignition, that is to say in the presence of very small currents, is at least three times as large, preferably at least five times as large and, with particular preference, at least ten times as large as at least in a portion of the back ignition phase. Consequently, with reference to the instant of the first primary circuit current rise during the forward ignition the saturation effect varies the primary circuit inductance by at least a factor of 3 or 5 or 10. A corresponding statement also holds, of course, for the abovementioned circuitry implementing of the temporal variation in inductance (including without saturation mode).

The second quantitative delimitation variant relates only to the case of saturation and for the purpose of delimitation makes use of the magnetic induction or flux density (B field) in the transformer. The aim in this case is for the magnetic induction to be at least 70% of what is termed the magnetic saturation induction of the transformer as early as in the initial phase of the back ignition, when at an instant the secondary current has reached 20% of its maximum in the back ignition. Values over 80%, even better over 90% and, in the most favorable case, over 95% of the saturation induction are preferred.

The magnetic saturation induction is a technical characteristic of the transformer core, and is, for example, specified by transformer manufacturers. It corresponds to the point of intersection of a tangent at the saturation portion of the magnetization curve, that is to say the graph illustrating the magnetic induction as a function of the magnetic field, with the induction axis, that is to say for a zero field (H=0). Physically, this is therefore the magnetization of the core which can be achieved in the saturation of the core, without the field contribution.

Given core materials which are favorable for the invention, saturation inductions of preferably at least 350 mT result, from which it may be seen that under favorable conditions the transformer is driven far beyond the value of 150 mT mentioned at the beginning.

The speed of the secondary circuit achieved by the measures according to the invention is expressed in a half-value width of the secondary current in the back ignition of preferably less than 800 ns.

The transformer core is preferably closed, and therefore has no air gap (that is to say a vanishingly small air gap in conjunction with multipartite cores or an annular core), and can preferably consist of an MnZn ferrite, the material N87 of the manufacturer EPCOS AG or an equivalent material of another manufacturer being suitable. The saturation induction is approximately 370 to 375 mT in this case.

The operating method according to the invention can be implemented as a push-pull method, the voltage pulses leading to the forward ignition being performed in a bipolar alternating fashion. Thus, respectively rectified voltage pulse impressions for which, of course, the forward ignition and the back ignition in the discharge lamp are nevertheless oppositely directed, are designated as a unipolar method. However, a bipolar push-pull method is advantageous with regard to the alkali ion migration effects (blackening effects) which are unavoidable in principle in discharge lamps. By employing a symmetrically alternating method, these effects are incapable in principle of resulting in damage to the lamp. However, it is to be considered in this case that even the use according to the invention of a back ignition provides a substantial improvement with reference to these problems. However, the forward ignition and back ignition are not necessarily symmetrical, and so residual effects can remain in the unipolar case.

Further preferred electrotechnical details relate firstly to the use of a ceramic multilayer storage capacitor in the power supply of the primary circuit, as has already been set forth in the cited prior application. Secondly, likewise as set forth there, it is preferred to use a center tap of the secondary winding of the transformer as reference potential of the secondary circuit.

As has already been set forth, the invention offers not only an improvement in efficiency but, above all, the possibility of driving relatively large lamp powers with very small and light ballasts. This is of decisive importance for some applications because, specifically, it offers the possibility of installing the ballast at sites at which only limited space is available. For example, a ballast according to the invention could move together with a silent discharge lamp in a photocopier or a scanner in a moving device of the silent discharge lamp, and so relatively long and, in addition, moving lines conducting high voltage can be avoided. Furthermore, there is the possibility of integrating such a ballast in lamp bases such that the discharge lamp can be produced and sold as a unit with an integrated ballast, and can be installed without difficulty by the user, for example, in a monitor. In this regard, the invention provides that the lines between the ballast and discharge lamp have a length of at most 10 cm, even more favorably a value of 5 cm. Furthermore, as mentioned, an integration in the base housing of the discharge lamp is preferably provided. A base housing is understood in general as a housing which is built directly on the discharge lamp and contains the electric connections and, in the case of this invention, also the ballast, in addition

DESCRIPTION OF THE DRAWINGS

The invention is explained in more detail below with the aid of a few exemplary embodiments, the individual features also being possible in other combinations within the essence of the invention. In particular, it may be pointed out that the invention has both method aspects and device aspects, and that the entire preceding and following description is to be understood with regard to both categories. In the figures:

FIG. 1 illustrates a schematic block diagram for an illuminating system according to the invention. In the figure, L firstly illustrates a discharge lamp which is designed for dielectrically impeded discharges. An equivalent circuit diagram showing a principle of the discharge lamp L is to be found in the second cited prior application in FIG. 2, and is explained in detail there with reference also to FIGS. 3 and 4 contained therein. The actual design of the discharge lamp L is not decisive for an understanding of the operating method according to the invention, the illuminating system and the ballast.

The discharge lamp L is connected into a secondary circuit S which, in addition to the discharge lamp L, contains a secondary winding W2 of a transformer T.

The primary winding W1 of the transformer T is situated in a primary circuit P which is supplied from a power supply Q with power for the transformer and the discharge lamp L.

Furthermore, a fast switch $T_Q$ is situated in one of the branches between the power source Q and the primary winding W1. This is a power MOSFET, which is switched or controlled by a control device SE.

A storage capacitor $C_Q$ is connected in parallel with the series circuit composed of the primary winding W1 and the switch $T_Q$. This storage capacitor $C_Q$ is recharged from the source Q, belongs in principle to the source Q and serves to apply a voltage across the primary winding W1 as a function of the switching state of the switch $T_Q$. These are ceramic multilayer capacitors.

A flow of current is produced firstly in a conventional way through the primary winding W1 in the case of the forward converter, the winding ratio of the transformer T being designed such that the flow of current through the primary winding WI in the secondary winding W2 and thus indirectly at the discharge lamp L induces a starting voltage. If the switch $T_Q$ is opened by the control device SE, energy remains in the secondary circuit S at least in the form of a residual magnetization of the transformer T.

As already explained in the introduction to the description, demagnetizing circuits have been used in the conventional way to reduce this residual magnetization, which circuits could comprise, for example, a third winding of the transformer T and a diode connected to this winding in parallel with the series circuit comprising the primary winding W1 and the switch $T_Q$. The residual magnetization of the transformer T could then be reduced in the blocking phase of the switch $T_Q$ via such a demagnetizing circuit.

Figure 1:
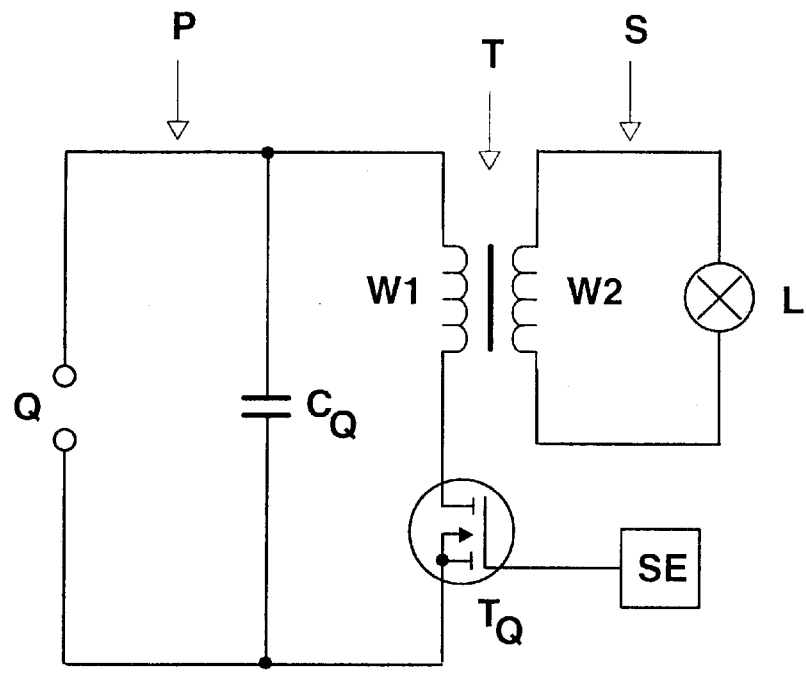
FIG. 1 shows a schematic block diagram of an illuminating system according to the invention.
Figure 2:
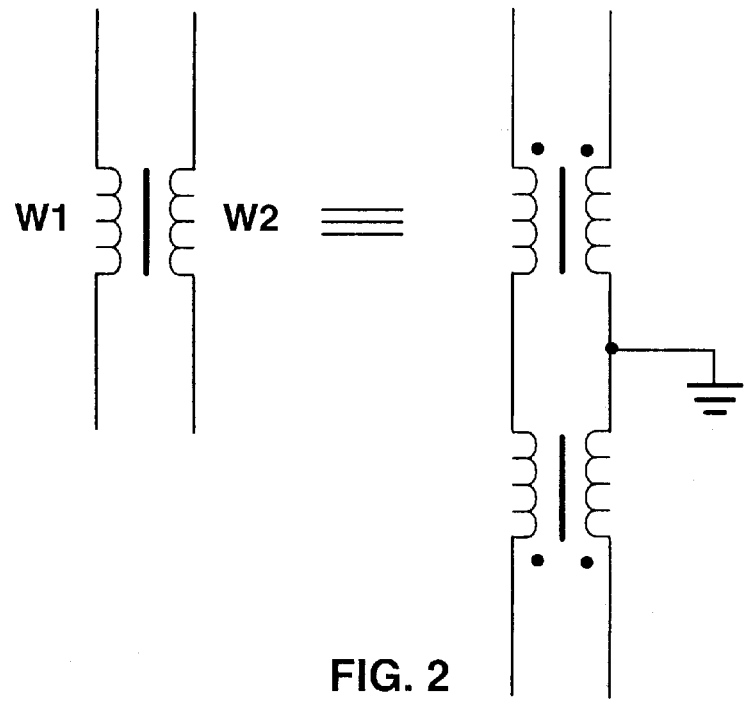
FIG. 2 shows an optional detail relating to the block diagram of FIG. 1.

It follows directly from FIG. 1 that there is complete electrical isolation between the primary circuit P and the secondary circuit S. This is of substantial advantage in terms of safety with regard to the high voltages present on the secondary circuit side. As shown in FIG. 2, a further safety advantage can be achieved when the secondary winding W2 has a (third) center tap which can serve as grounded reference potential of the secondary circuit S. If, by contrast, the positive and negative pulses from the secondary winding W2 are applied to the respective electrode groups of the discharge lamp L, the full induced voltage is present as before across the discharge lamp L, although in each case only half the maximum voltage occurs as safety-relevant voltage in the secondary circuit by comparison with the center tap potential. In fact, here T is actually two transformers.

This technique also substantially improves the electromagnetic compatibility with regard to the emission from the secondary circuit. Reference may be made to DE 197 34 885.8.

Figure 3:
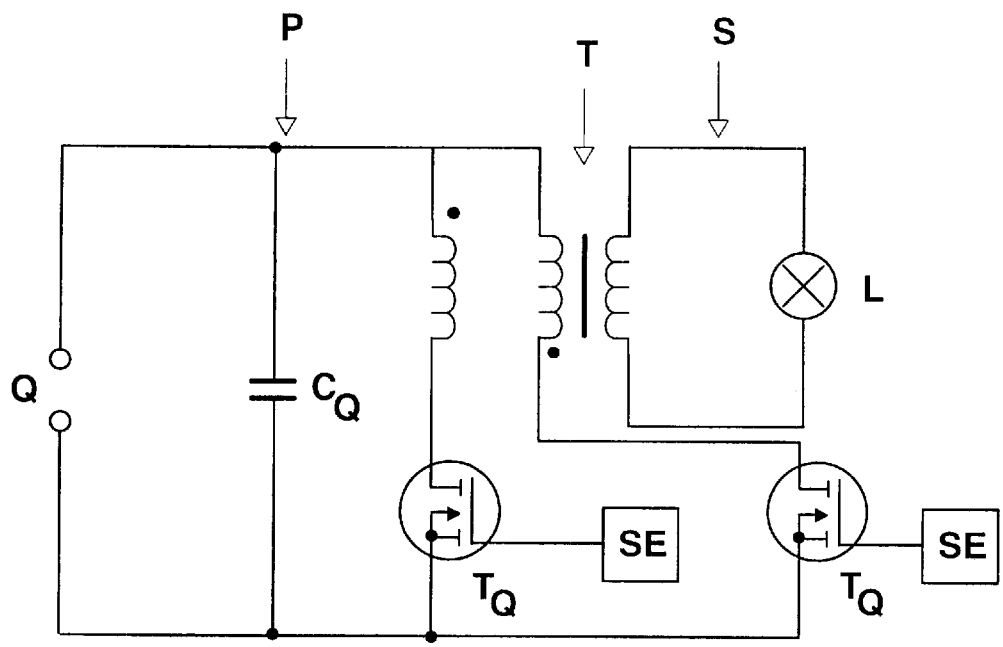
FIG. 3 shows a schematic block diagram of a further illuminating system according to the invention, as a second exemplary embodiment.
Figure 4:
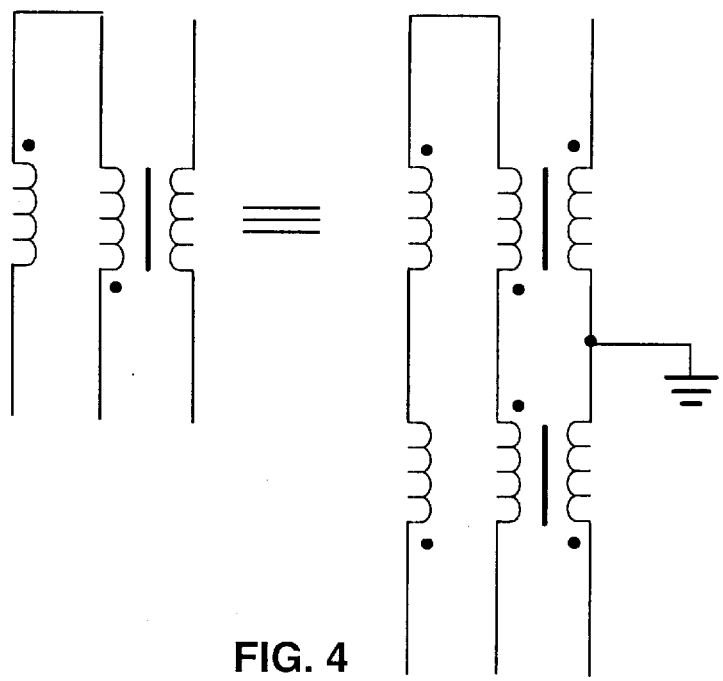
FIG. 4 shows an optional detail relating to the block diagram of FIG. 3.

The circuit diagrams in FIGS. 3 and 4 correspond largely to those in FIGS. 1 and 2, and show an optional design of the invention according to a push-pull principle. Consequently, the circuit branches from the primary winding W1 and the switching transistor $T_Q$ with the control device SE are of duplicate design. In this case, the winding senses of the two primary windings are directed opposite to one another. It is therefore possible by operating these two branches to generate voltage pulses of opposite polarity in the secondary circuit S. Of course, the two control devices SE can be combined and provide alternating pulses to the two switching transistors $T_Q$.

FIG. 4 illustrates how, in the bipolar case, the winding orientations in the embodiment in accordance with FIG. 2 are selected with center tap on the secondary side.

Figure 5:
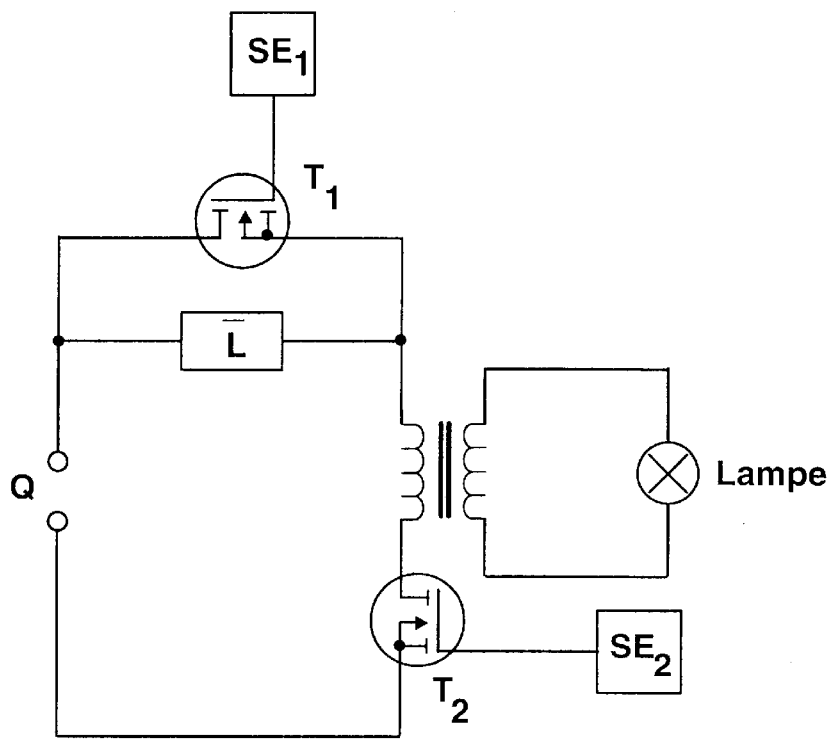
FIG. 5 shows a schematic block diagram of an illuminating system according to the invention, as a third exemplary embodiment.
Figure 6:
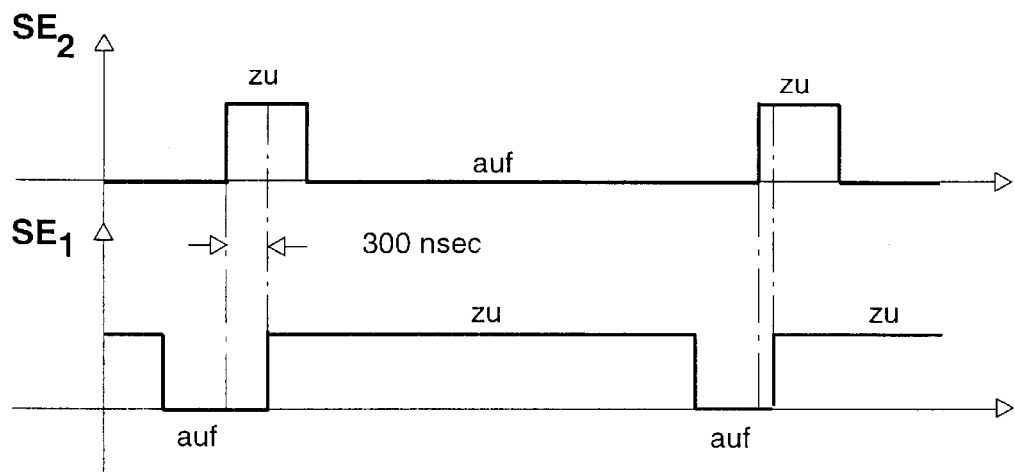
FIG. 6 shows schematic timing diagrams relating to the operation of the exemplary embodiment of FIG. 5.

FIGS. 5 and 6 serve the purpose of schematically illustrating an alternative implementation of the invention by periodically increasing the primary circuit inductance with the aid of a further inductor L connected in series with the primary winding W1. This purpose is served by a switching device, specifically a MOSFET $T_1$ with an appropriate control device $SE_1$, which is connected in parallel with the inductor L and short-circuits the latter in the conducting state. Consequently, the elements corresponding to the switches $T_Q$ and the control devices SE in FIGS. 1 and 3 are denoted by $T_2$ and $SE_2$.

The storage capacitor $C_Q$ has been omitted for the sake of simplicity.

It follows from FIG. 6 that opening and closing the MOSFET $T_1$ appropriately with the aid of the control device $SE_1$, specifically in a fashion tuned to the operation of the control device $SE_2$, makes it possible correspondingly to increase the effective inductance in the primary circuit in, for example, the first 300 ns of the pulses. This exemplary embodiment serves the purpose of clarifying that the invention can be embodied not only by a saturation mode of the transformer T. The following description with the aid of the further figures relates, however, only to the first two exemplary embodiments in FIGS. 1–4.

Figure 7:
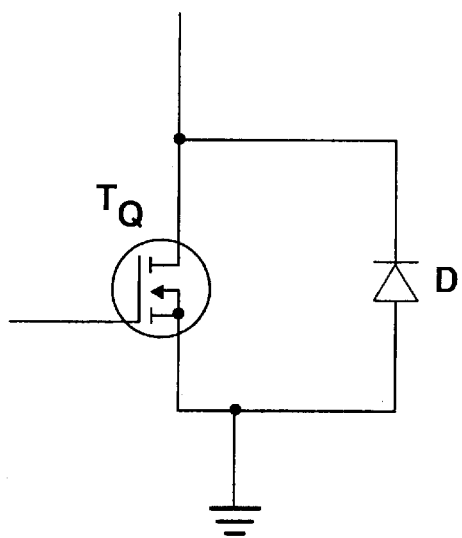
FIG. 7 shows a schematic illustration of the wiring of the transistors in the circuit diagrams according to FIG. 1 and FIG. 3.

FIG. 7 shows a further detail, specifically the wiring of one of the switching transistors $T_Q$ in the circuits in FIG. 1 and FIG. 3. In this case, the power MOSFET has what is termed a freewheeling diode D between the source and drain, the polarity being selected such that the freewheeling diode D blocks in the conducting state, that is to say when a primary circuit current flows through the transistor $T_Q$.

In the blocking state of the transistor $T_Q$, the freewheeling diode D can then conduct a reflux of energy from the secondary circuit S into the primary circuit P in the form of a reversed primary circuit current which recharges the storage capacitor $C_Q$. This provides a possibility of demagnetization which preserves the electrical isolation between the primary circuit P and secondary circuit S.

Figure 8:
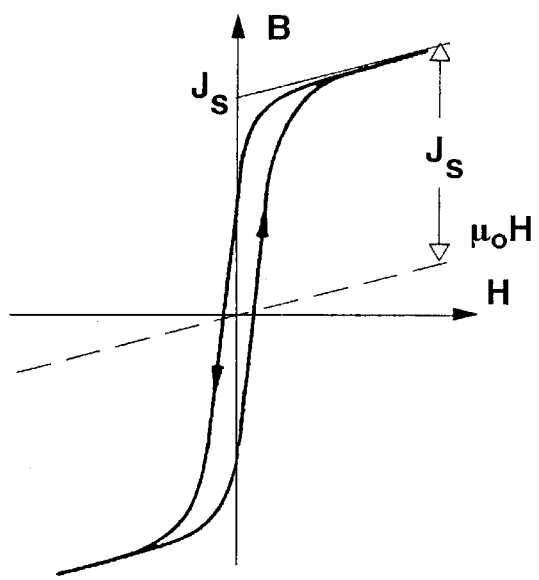
FIG. 8 shows a schematic diagram explaining the hysteresis effect in the transformer core of the circuits in FIGS. 1 and 3.

FIG. 8 shows a schematic of the typical hysteresis behavior of a magnetic material, that is to say the core material in the transformer T in FIGS. 1 and 3. The magnetic field strength H prescribed by the winding current generates a magnetization J in the magnetic material which rises up to a specific saturation magnetization $J_S$. The overall result for the magnetic induction (or flux density) B is $$B=\mu_0 H+J.$$

The magnetization J follows the field strength H with a certain hysteresis, because the Weiss districts in the material must be aligned and/or reoriented. Saturation occurs after alignment of all the Weiss districts, as may clearly be observed in FIG. 8. The overall result is the known hysteresis curve of the relationship between the magnetic induction B and field strength H. The point of intersection of a straight tangent illustrated in FIG. 8 at the saturated portion, rising with the gradient $\mu_0$, of the hysteresis curve with the B axis thus likewise corresponds to the saturation magnetization $J_S$, or can also be interpreted as magnetic saturation induction. Its importance becomes clearer from the following FIG. 9, which illustrates an actual hysteresis curve of the magnetic core material used here. Specifically, the magnitude of the gradient $\mu_0$ is illustrated in an exaggeratedly large fashion in order to permit the physical relationships to be more effectively recognized. In fact, the saturated portion of the hysteresis curve has a very flat profile.

Figure 9:
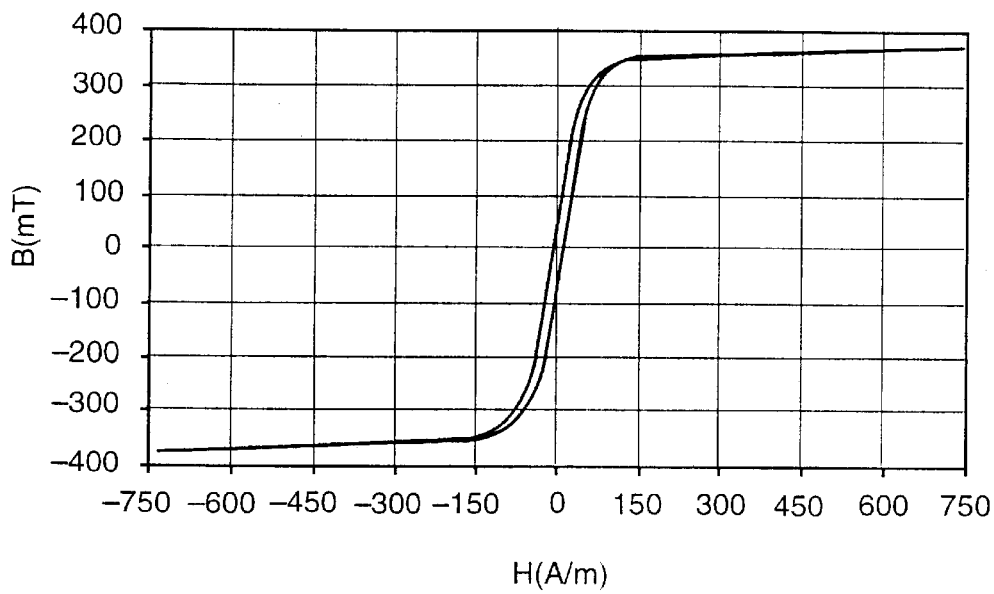
FIG. 9 shows an actual hysteresis curve of the practically used transformer core material as a function of the magnetic field strength.

In FIG. 9, the actual hysteresis curve (relatively realistic temperature of 100° C. for the transformer operation) shows that it is possible to produce magnetic inductions of the order of magnitude of the saturation induction and above only by means of magnetic field strengths (H) which are disproportionately large by comparison with weaker drive ranges. In the case of the material used here (EPCOS N 87, transformer ring core without air gap, which is essential here), the saturation effects are clearly detectable from about 200–300 mT. In fact, according to classical ideas not even the region of 150 mT would be exceeded. It will be shown in the case of the quantitative examples still to be illustrated below that this region is clearly exceeded by the invention.

The saturation behavior in FIGS. 8 and 9 can also be interpreted as a field dependence of the relative permeability $\mu_{rel}$ ($B=\mu_{rel}\mu_0 H$) which decreases drastically starting from specific magnetic field strengths. However, by contrast with the B(H) relationship in FIGS. 8 and 9, this representation offers no additional physical substance.

Figure 10:
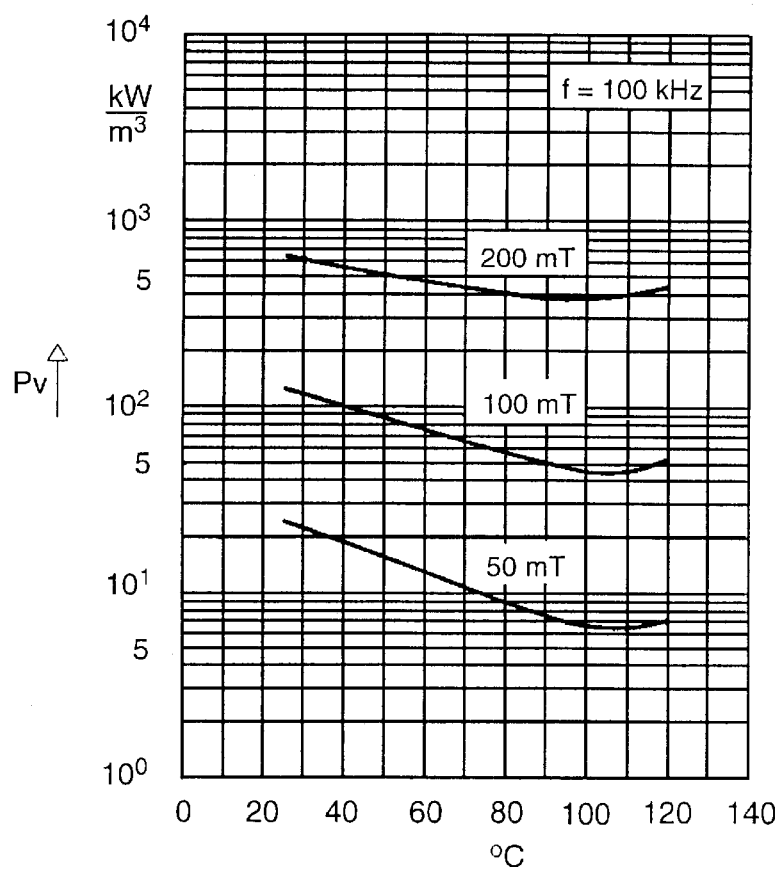
FIG. 10 shows a diagram illustrating the temperature dependence of magnetic losses in transformer core materials.

Moreover, the hysteresis behavior from FIGS. 8 and 9 signifies losses in the transformer core which are expressed by heating of the transformer. In accordance with FIG. 10, these losses are also temperature-dependent, a minimum being exhibited which becomes flatter with increasing magnetic induction (parameter at the curves) and is situated at somewhat lower temperatures. As already stated, the steep rise, visible in FIG. 10, in the core losses Pv (ordinate) with increasing degree of magnetic drive would firstly lead the person skilled in the art to aim for a lower degree of drive in order to minimize the losses. The invention has now shown that by drive the transformer far into the saturation region the losses owing to the smaller transformer volume and the hysteresis effects, which no longer increase starting from onset of the saturation, certainly remain within bounds. In this case, the invention aims at a design in which the transformer temperature adjusts itself in the range of the minimum on the loss curve which is visible in FIG. 10. Typical temperatures are in the range of 80–100° C. given (as set forth further below in more detail) a magnetic induction occurring with an order of magnitude of just 400 mT. This large magnetic induction is not covered in FIG. 10, because this is a range which is otherwise not used technically. However, reference may be made to the explanations relating to FIGS. 12 and 13 as regards the significance of the saturation for this exemplary embodiment.

Figure 11:
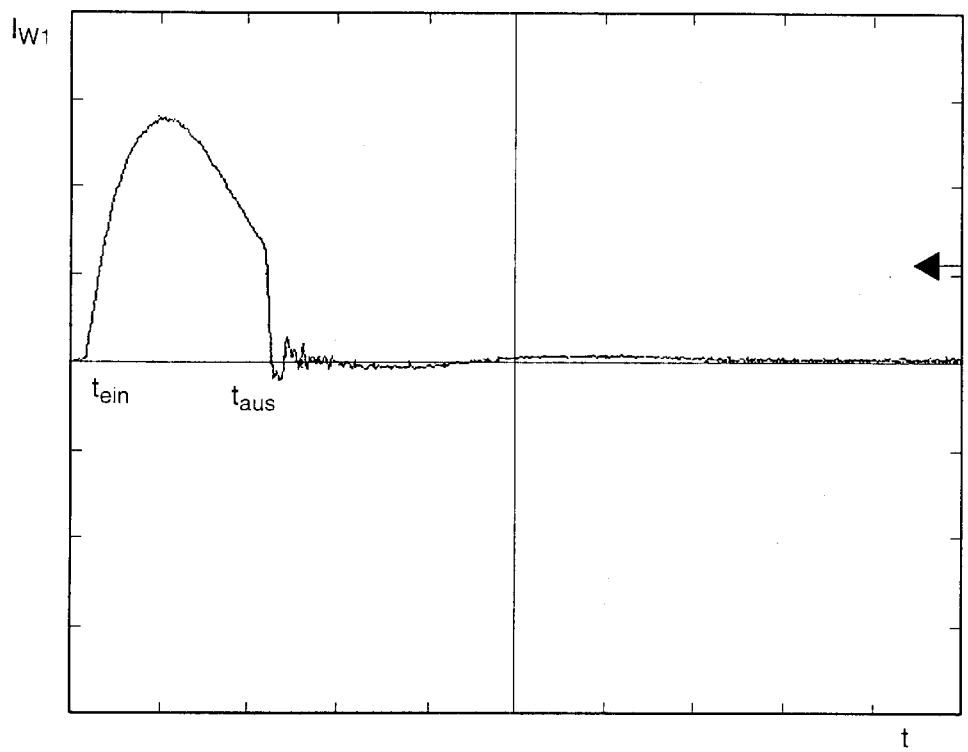
FIG. 11 shows a measuring curve with a typical temporal primary current profile in the circuits of FIGS. 1 and 3.

FIG. 11 shows a typical real temporal profile of the primary circuit current as a function of the time t. After the switching transistor $T_Q$ has been turned on, there is firstly the typical rise, which is already known from the multiply cited prior application. It is seen that the switching transistor $T_Q$ is turned off after traversal of the maximum on the primary circuit current curve, specifically at the point where the kink occurs toward the then very fast drop in the primary circuit current $I_{W1}$.

Selected as switching instant $t_{off}$ is the instant at which the curve of the primary circuit current $I_{W1}$ would, were there no turning off, rise further again, as illustrated by dashes. The rise, associated with the current maximum, in the primary circuit current beyond the linear transformer recharging is probably produced by the forward ignition, which to some extent "pulls" current from the secondary winding W2 owing to the steep drop in the ohmic resistance of the discharge lamp L. This switching instant is optimal as regards the switching losses in the switching transistor or transistors $T_Q$, because switching is performed with a minimal current.

Figure 12:
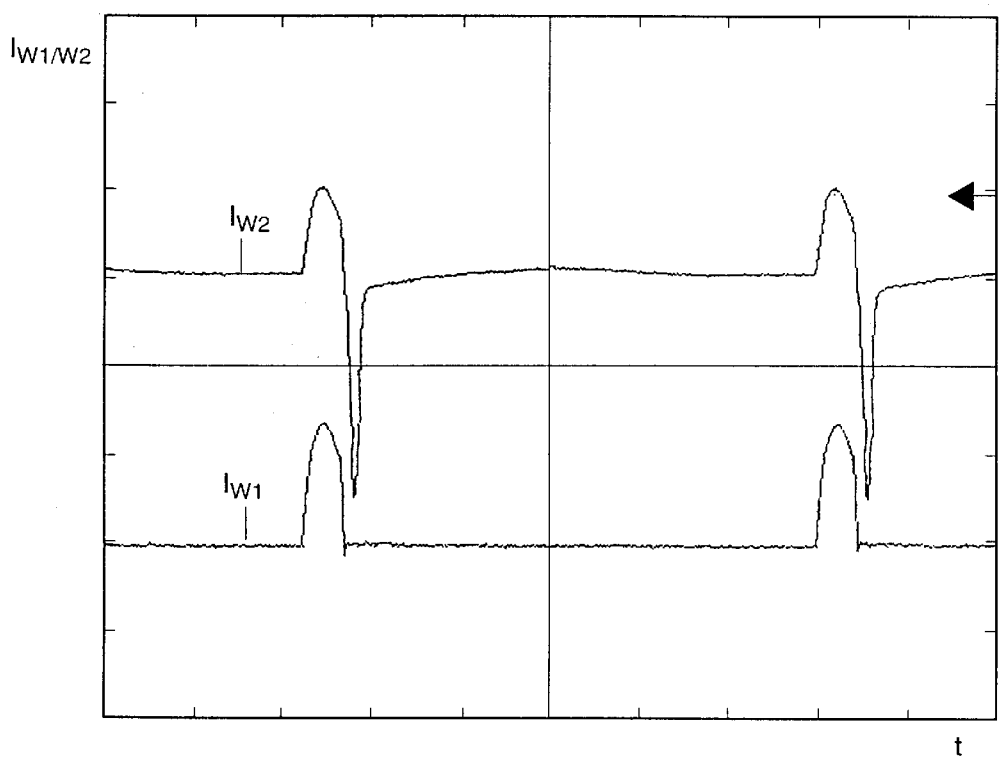
FIG. 12 shows measuring curves of the temporal primary current profile and secondary current profile in the circuit in accordance with FIG. 1.
Figure 13:
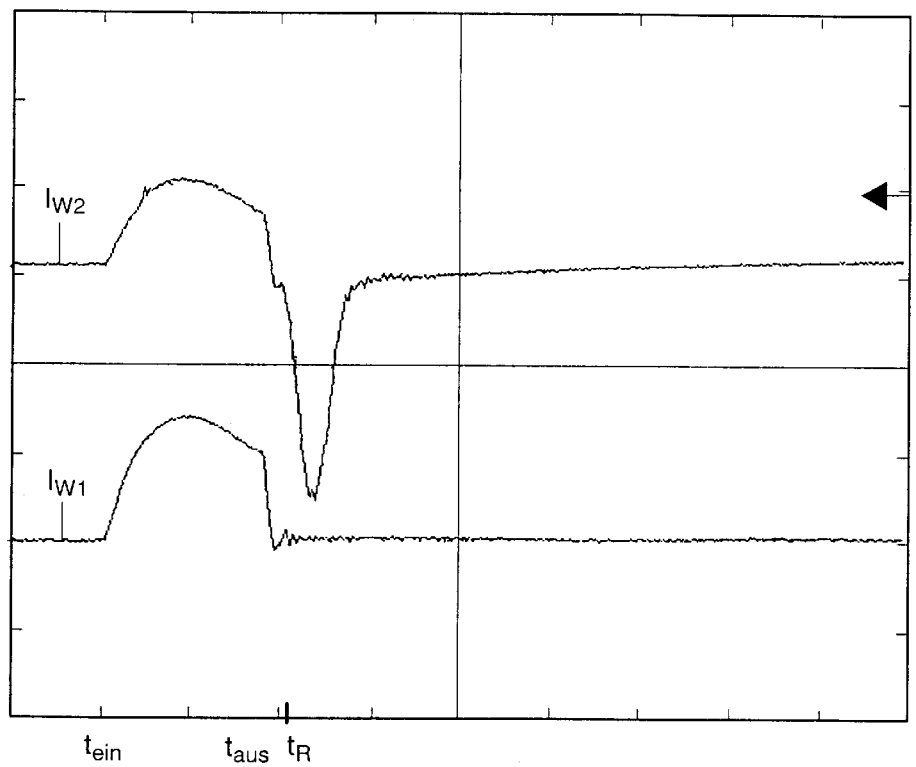
FIG. 13 shows a detailed illustration relating to FIG. 12.

In FIG. 12, the primary circuit current $I_{W1}$ is illustrated in the bottom area; the secondary circuit current $I_{W2}$ is in the top area. The current zero points are displaced relative to one another in this case, in order to be able to relate the curves more effectively to one another. A corresponding statement holds for the illustration in FIG. 13, which illustrates on an enlarged scale a pulse in the primary circuit current $I_{W1}$ and in the secondary circuit current $I_{W2}$ in FIG. 12. FIG. 13 shows the steep drop in the primary circuit current $I_{W1}$ after the instant $t_{off}$. It is to be seen at the same time that a return oscillation starts on the secondary side of the transformer T and leads to a pulse of opposite polarity in the secondary circuit current $I_{W2}$, specifically to the back ignition according to the invention. It is clearly in evidence that the forward ignition, which extends over a comparatively somewhat longer period (essentially between $t_{on}$ and $t_{off}$), and thus the first pulse of the secondary circuit current $I_{W2}$, are followed by a very much more violent and shorter back ignition pulse. This corresponds precisely to the mechanism according to the invention, in accordance with which the forward ignition is at least prepared in the non-saturation phase of the transformer T, or takes its course entirely, specifically after $t_{on}$, whereas the back ignition takes its course for the most part with a strongly saturated transformer T.

The instant $t_R$ illustrated in FIG. 13 corresponds to the instant, already mentioned at another juncture, at which the secondary current has reached 20% of its maximum during the back ignition. At this instant, which for the purposes of this description characterizes the initial region of the back ignition, there is already a marked saturation of the transformer T in the case of this exemplary embodiment, as may be seen from the numerical values following further below.

FIG. 13 shows, furthermore, that the secondary current curve $I_{W2}$ of the forward ignition phase corresponds very exactly to the primary current curve $I_{W1}$ both in shape and in the temporal positioning. This is a typical (if not necessary) effect of the invention. In fact, phase shifts usually occur in a transformer, because the induced current is proportional to the time derivative of the exciting current. Because of the induction mechanism in the transformer T, in the case of a gradient maximum in the current $I_{W1}$ the current $I_{W2}$ should exhibit a maximum and fall again thereafter. However, this does not correspond to the profile in FIG. 13. In the present case, there is no secondary current pulse immediately preceding the rise in the primary circuit current $I^{W1}$. The secondary circuit current $I_{W2}$ is not observed to "follow" a primary circuit current pulse. On the contrary: the current $I^{W2}$ rises at the same time as $I_{W1}$.

Specifically, the temporal behavior of the impedance of the lamp L continues to be important for the temporal profile of the secondary circuit current $I_{W2}$. After the initial preionization and after the voltage is impressed into the secondary circuit, this impedance becomes increasingly low-resistance, such that the secondary circuit current $I_{W2}$ rises further despite the decreasing gradient of the primary circuit current $I_{W1}$. The effect, typical of the dielectrically impeded discharges, of increasing polarization in the lamp L ensures the secondary circuit current $I_{W2}$ drops again in the further course of events. Consequently, there is also a slow drop in the primary circuit current $I_{W1}$. At the turn-off instant $t_{off}$, $I_{W2}$ also drops relatively quickly to zero in addition to $I_{W1}$, because a negative field voltage pole is induced in the secondary circuit by the large inverted time derivative of the primary circuit current.

Overall, a relatively direct correspondence between the currents $I_{W1}$ and $I_{W2}$ results in the interplay between the transformer T and the time-dependent behavior of the lamp L. This virtually prevents the saturation effect, which would have to be expected in the case of power transformers with large current modulations owing to the phase shifts between the primary side and secondary side. A transformation saturation therefore takes place in this exemplary embodiment only during the back ignition phase, in which the primary circuit current $I_{W1}$ vanishes.

However, the invention relates not only to such exemplary embodiments. In the case of other shapes of the current profiles and saturation effects, as well, the mechanism according to the invention would function even in the forward ignition phase to the extent that, in any event in the initial phase of the forward ignition, no saturation, and thus no reduction in inductance can occur solely because of the smallness of the primary circuit current $I_{W1}$.

Moreover, it has emerged that a braked edge steepness at the start is also not advantageous for the back ignition. The back ignition seems to be preimpressed by the forward ignition with regard to the discharge structure. On the contrary, it is preferred in the context of the invention for the saturation effect, and thus the reduction in inductance in the secondary circuit, to occur already at as early an instant as possible. It can thereby be achieved that the secondary current swings back quickly and with a large amplitude in the back ignition pulse. As already explained, the depression of the inductance also leads to a reduction in impedance in the secondary circuit, and thus to secondary circuit currents of high level, as desired.

Referring to the discussions, contained in the multiply cited prior application, on the differences between the functional principles of the flyback converter and forward converter, it may further be noted that because of the electrical isolation an additional flyback converter function can certainly come about with regard to the back ignition in the case of the forward transformer principle treated in this application. Specifically, after the switching transistor $T_Q$ has been switched off the sudden primary circuit current drop to be seen in FIGS. 12 and 13 causes a corresponding induced voltage pulse on the secondary side according to the flyback converter principle, but the forward ignition is generated according to the forward converter principle.

Figure 14:
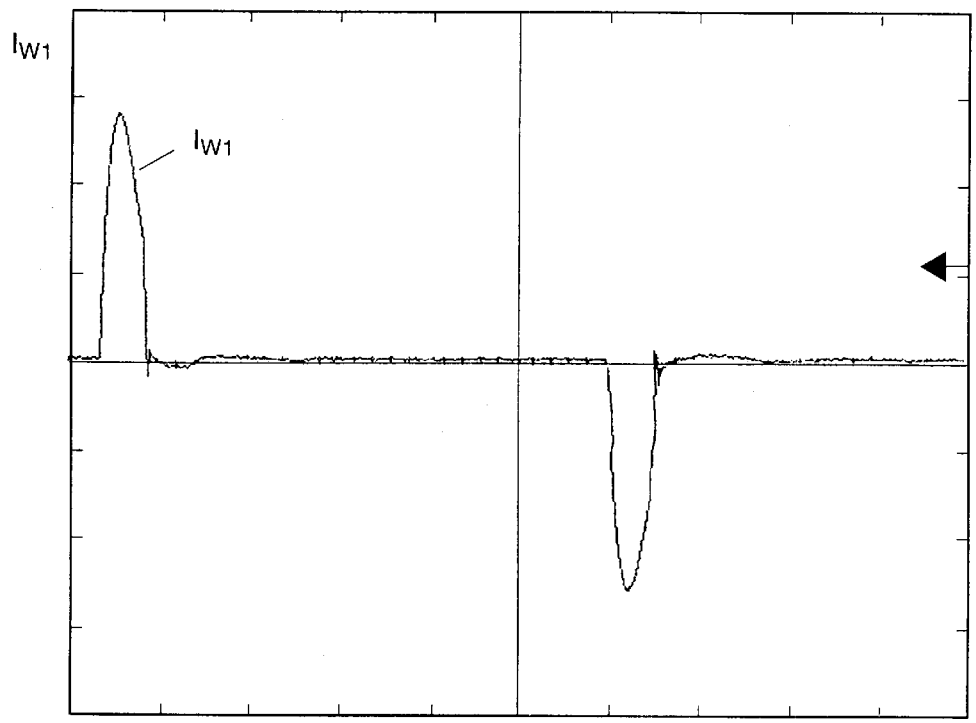
FIG. 14 and FIG. 15 show, in a way corresponding to FIG. 12, the temporal primary current profile and secondary current profile for the circuit in FIG. 3.
Figure 15:
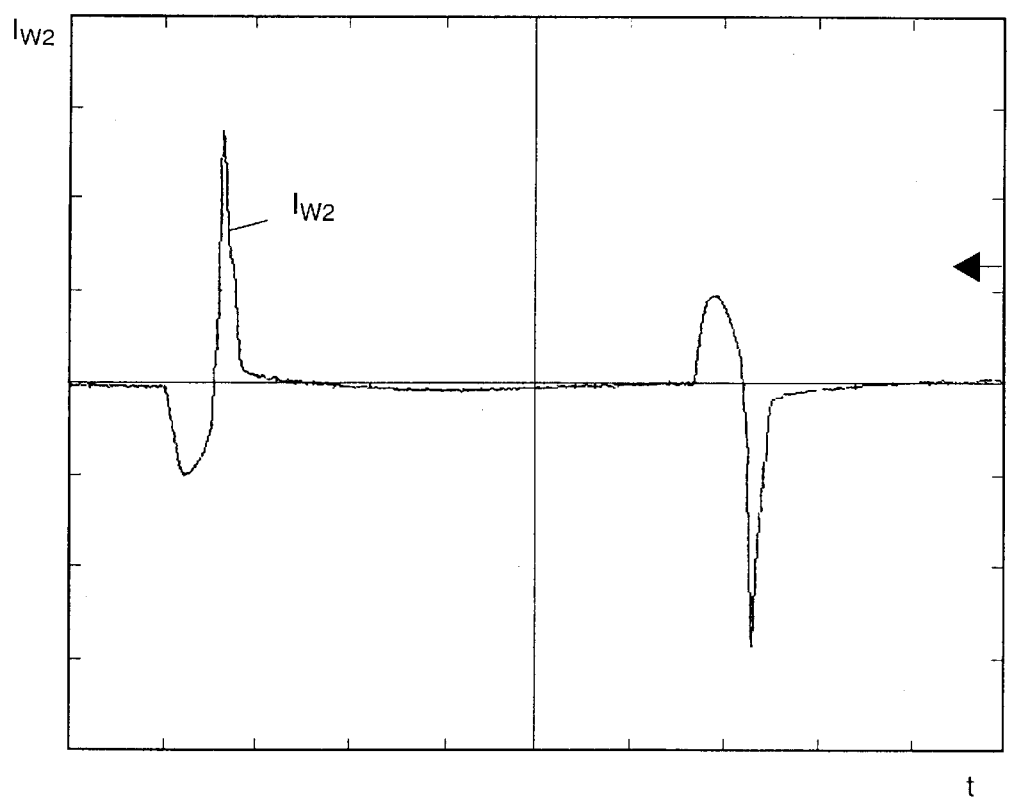

Corresponding current profiles are also shown in FIG. 14 (primary circuit current $I_{W1}$) and FIG. 15 (secondary circuit current $I_{W2}$) for the case of the push-pull method with the circuit according to FIG. 3. The only difference in relation to the current profiles according to FIG. 12 consists in the alternation of the signs between sequential active-power pulses. Consequently, alkali ion migration effects (blackening phenomena) can be excluded by asymmetries between forward and back ignitions.

The result is an improved service life for the discharge lamp L.

It is, of course, not imperative for the dead times between the active-power pulses of opposite polarity to be completely symmetric, although a preferred value will generally be set for the dead time. However, in principle alternately shorter and longer dead times are also conceivable up to the point of a situation in which the reverse-power pulses of opposite polarity follow one another directly, that is to say jointly form an active-power pulse and are not separated by a dead time.

The following technical data are valid in detail for the exemplary embodiments: the maximum primary circuit current $I_{W1\ max}$ is 14 A and the primary circuit current is 10 A at the turn-off instant $t_{off}$. The supply voltage is 24 V in this case. The storage capacitor $C_Q$ is implemented by five parallel-connected ceramic multilayer capacitors of 10 µF each. The switching transistor $T_Q$ is a BUZ104S from Infineon AG. The transformers used (2 annular core transformers with a core R 14, N87, 2 number of turns per unit length for the primary, 140 number of turns per unit length for the secondary, and a magnetic path length of 3.5 cm) therefore produce during the back ignition a maximum magnetic field strength $H_{max}$ of 2 280 A/m in conjunction with a secondary current $I_{W2\ max}$=0.57 A. It holds that B $(t_R)$=368 mT for the magnetic induction in the initial phase of the back ignition, that is to say at the instant $t_R$ at which the secondary current $I_{W2}$ has reached 20% of the maximum current $I_{W2\ max}$. For comparison: the saturation magnetization $J_S$ of the used core material N87 from EPCOS AG is situated at about 100° C. in conjunction, approximately, with 374 mT.

$I_{W1}(t_{out})$=6 A, $I_{W2\ max}$=0.66 A, $H_{max}$=2 640 A/m in the bipolar case in accordance with FIGS. 3, 14 and 15, and the induction B $(t_R)$ has a value of 369 mT in the initial phase of the back ignition, that is to say at the instant $t_R$. The saturation of the core is therefore present already shortly after the change in sign of the secondary circuit current $I_{W2}$.

In both cases, the transformer temperature was approximately 90° C. (between 80° and 100° C.), and was thus in a range favorable with regard to the losses. The core volume was 860 mm$^3$ in all (divided into two transformers) and exhibited total magnetic losses of approximately 2 W. It is thereby possible to achieve very good efficiency values in conjunction with an extraordinarily small overall size for the ballast. It was possible in this case to reduce the size of the ballast to the size of a matchbox by means of the drastic reduction in the size of the transformer, in conjunction with a lamp power of 21.5 W, it being possible to expect even further savings in volume due to further optimization measures, chiefly with regard to the packing of the individual elements inside the ballast.

The discharge lamp L used in the exemplary embodiments is a tubular silent fluorescent lamp with two interior electrodes. The length of the lamp is 29 cm and the outside diameter 10 mm in conjunction with a wall thickness of 0.6 mm. The filling consists of Xe at 170 mbar.

Using the above numerical values, the following estimate can be undertaken for the modulation which is sensible in the view of a conventional person skilled in the art: given a system control of approximately 20 W and a permissible power loss of 2 W (per transformer, 1 W leads to approximately 100° C. with a thermal resistance of about 80 K/W), a magnetic limiting loss of 2 325 kW/m$^3$ would result in the case of the above core volume per transformer of 430 mm$^3$. Given pulse widths in the region of 500 ns and an assumed frequency of 1 MHz, a maximum modulation of 70 mT results in this case for a continuous sinusoidal operation (not implemented here). If a mark-to-space ratio of 1:10 is assumed with regard to the pulsed operating method, this value is of course increased, because the losses per pulse must be averaged over time. Assuming that the core withstands the heat and that linear extrapolation is possible (in fact, the losses rise faster than linearly with the modulation), modulations of approximately 170 mT result in this case as absolute maximum values. These conventional considerations are therefore clearly surpassed by the above modulations.

What is claimed is:

1. An operating method for a discharge lamp (L) with a dielectric layer between at least one electrode and a discharge medium, which method uses a ballast having a power-supplied primary circuit (P), a secondary circuit (S) containing the discharge lamp (L), and a transformer (T) connecting the primary circuit (P) to the secondary circuit (S), and in which method a voltage pulse is impressed on the secondary circuit (S) from the primary circuit (P) via the transformer (T) using the forward transformer principle and leads to an external voltage ($U_L$) across the discharge lamp (L) which effects ignition, and to an internal counterpolarization in the discharge lamp (L), characterized in that, after the impression of the voltage pulse, the secondary circuit (S) executes a half wave by means of which the charge effecting the external voltage ($U_L$) across the discharge lamp (L) is removed from the discharge lamp (L), as a result of which the discharge lamp (L) is caused to execute a back ignition owing to the remaining internal counterpolarization, and in that an inductance ($L_{W1}$, $L_{W2}$) governing the temporal variation in a current ($I_{W1}$, $I_{W2}$) through the transformer (T) is varied temporally within a period including a forward ignition and a back ignition such that the altered inductance ($L_{W1}$, $L_{W2}$) is substantially larger in an initial phase of the impression of the voltage pulse which leads to the forward ignition than in at least a portion of the back ignition phase, in which the charge is removed from the discharge lamp (L) after the forward ignition and the back ignition is performed.

2. The operating method as claimed in claim 1, in which the primary circuit inductance ($I_{W1}$) is varied by switching in an inductor in a temporally variable fashion.

3. The operating method as claimed in claim 1, in which the secondary circuit (S) is isolated as a resonant circuit after the forward ignition by the external voltage ($U_L$).

4. The operating method as claimed in claim 1, in which virtually no primary circuit current ($I_{W2}$) flows during the back ignition phase.

5. The method as claimed in claim 1, in which the primary circuit (P) is clocked via a MOSFET switch ($T_Q$) with a freewheeling diode.

6. The method as claimed in claim 1, in which the primary circuit inductance ($L_{W1}$) is varied such that at the start of the voltage pulse, leading to the forward ignition, in the secondary circuit (S) it is at least three times as large ($L_{w1}(t_{on})$) as at its minimum.

7. The operating method as claimed in claim 1, in which the half-value width of the secondary current ($I_{W2}$) in the back ignition is smaller than 800 ns.

8. The operating method as claimed in claim 1, in which the impression of the voltage pulse leading to the forward ignition is performed in a bipolar alternating fashion using a push-pull method.

9. The operating method as claimed in claim 1, in which the primary circuit (P) is supplied with power from a source (Q) with a ceramic multilayer capacitor ($C_Q$) as storage capacitor.

10. The operating method as claimed in claim 1, in which a center tap of the transformer (T) is used in the secondary circuit (S) as reference potential.

11. A ballast for a discharge lamp (L) with a dielectric layer between at least one electrode and a discharge medium, having a power-supplied primary circuit (P), a secondary circuit (S) for the discharge lamp (L), and a transformer (T) connecting the primary circuit (P) to the secondary circuit (S), the ballast being designed for an operating method as claimed in claim 1.

12. The operating method as claimed in claim 1, in which the transformer (T) has a core without an air gap.

13. The operating method as claimed in claim 12, in which the core of the transformer (T) consists of an MnZn ferrite material, in particular of the material N87 from the manufacturer EPCOS AG.

14. An illuminating system having a discharge lamp (L) with a dielectric layer between at least one electrode and a discharge medium and with a ballast having a power-supplied primary circuit (P), a secondary circuit (S) into which the discharge lamp (L) is switched, and a transformer (T) connecting the primary circuit (P) to the secondary circuit (S), characterized in that the illuminating system is designed for anoperating method as claimed in claim 1.

15. The illuminating system as claimed in claim 14, in which the length of the electric lines between the ballast and the discharge lamp (L) is at most 10 cm.

16. The illuminating system as claimed in claim 15, in which the ballast is incorporated in a base housing of the discharge lamp (L).

17. The method as claimed in claim 1, in which the transformer (T) is used in a saturation mode, the variation in the inductance ($L_{w1}$, $L_{w2}$) resulting at least partially from a variation in the relative permeability ($\mu$) of the core of the transformer (T).

18. The method as claimed in claim 17, in which after the forward ignition by the external voltage ($U_L$), the primary circuit current ($I_{W1}$) through the transformer (T) is interrupted at an instant at which the primary circuit current ($I_{W1}$) would exhibit a minimum after the forward ignition.

19. The operating method as claimed in claim 17, in which the magnetic induction (B ($t_R$)) at an instant ($t_R$) during the back ignition at which the secondary current ($I_{W2}$) has reached 20% of its maximum value ($I_{W2max}$) during the back ignition, is 70% of the magnetic saturation induction ($J_S$) of the transformer (T).

20. The operating method as claimed in claim 19, in which the saturation induction ($J_S$) is at least 350 mT.

* * * * *